United States Patent
Jian et al.

(10) Patent No.: US 7,933,348 B2
(45) Date of Patent: Apr. 26, 2011

(54) DC OFFSET ESTIMATION SYSTEM AND METHOD

(75) Inventors: Yung-Yih Jian, Taoyuan County (TW); Jen-Yuan Hsu, Kinmen County (TW); Huei-Jin Lin, Taichung (TW); Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 855 days.

(21) Appl. No.: 11/882,918

(22) Filed: Aug. 7, 2007

(65) Prior Publication Data

US 2009/0041161 A1 Feb. 12, 2009

(51) Int. Cl.
*H04L 27/28* (2006.01)
(52) U.S. Cl. ........................................................ 375/260
(58) Field of Classification Search ................... 375/260, 375/203, 319, 343, 344, 346, 316, 229; 714/747; 370/343, 207, 208; 455/41.2, 67.11
See application file for complete search history.

(56) References Cited

U.S. PATENT DOCUMENTS

| | | | |
|---|---|---|---|
| 5,818,544 A * | 10/1998 | Han | 348/725 |
| 7,313,125 B2 * | 12/2007 | Hori et al. | 370/343 |
| 2002/0160740 A1 | 10/2002 | Hatcher et al. | |
| 2003/0058966 A1 | 3/2003 | Gilbert et al. | |
| 2003/0133518 A1 | 7/2003 | Koomullil et al. | |
| 2003/0152021 A1 * | 8/2003 | Wang et al. | 370/208 |
| 2003/0174790 A1 * | 9/2003 | Ho et al. | 375/340 |
| 2004/0086061 A1 | 5/2004 | Lundberg | |
| 2004/0264432 A1 | 12/2004 | Hori et al. | |
| 2005/0025041 A1 | 2/2005 | Marsili | |
| 2005/0070271 A1 | 3/2005 | Lie et al. | |
| 2005/0111525 A1 | 5/2005 | Driesen et al. | |
| 2006/0103463 A1 | 5/2006 | Lee et al. | |
| 2008/0089443 A1 * | 4/2008 | Sanada et al. | 375/319 |

FOREIGN PATENT DOCUMENTS

| | | |
|---|---|---|
| TW | I237980 B | 4/2000 |
| TW | I236222 B | 7/2005 |
| TW | I239715 B | 9/2005 |
| TW | I240499 B | 9/2005 |

OTHER PUBLICATIONS

Office Action dated Jan. 10, 2011 in Taiwanese Application No. 096134821.

* cited by examiner

*Primary Examiner* — Khai Tran
(74) *Attorney, Agent, or Firm* — Birch, Stewart, Kolasch & Birch, LLP (57) ABSTRACT

A DC offset estimation system is disclosed. A DC offset estimation system includes a carrier frequency offset estimator receiving an input signal and estimating a carrier frequency offset value, a symbol timing recovery unit providing a symbol boundary of the input signal, and a DC offset estimator estimating a DC offset value to compensate the input signal based on the input signal, the carrier frequency offset value, and the symbol boundary.

22 Claims, 8 Drawing Sheets

DC OFFSET ESTIMATION SYSTEM AND METHOD

BACKGROUND OF THE INVENTION

1. Field of the Invention

The invention relates to DC offset estimation system and method.

2. Description of the Related Art

Figure 1:
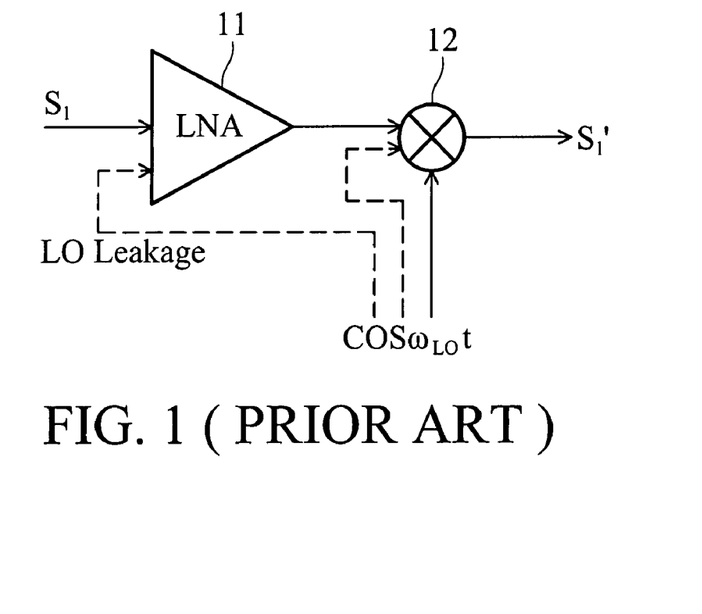
FIG. 1 and FIG. 2 show schematic diagrams of DC offset generation in a receiver.
Figure 2:
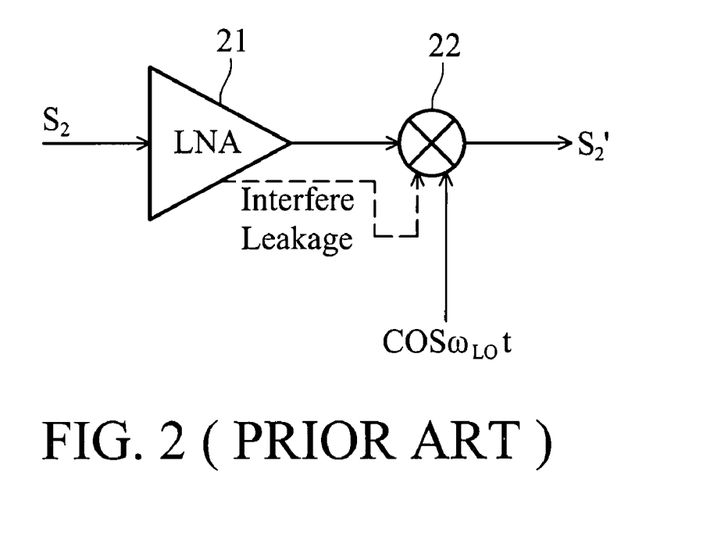

In wireless communication, DC offset is generated both in transmitter and receiver. At the transmitter, one possible reason for DC offset generation is that the DAC (digital to analog converter) is not ideal, and the input digital data may not even contain a DC value, the converted data might also contain DC offset. Additionally, the nonlinear feature of other analog elements of the transmitter may also cause unwanted DC offset. As to the receiver, if the receiver has Zero IF configuration, the DC offset effect is more obvious. FIG. 1 and FIG. 2 show schematic diagrams of DC offset generation in a receiver. Since the Zero IF receiver utilizes only one stage conversion to convert a radio frequency signal to a baseband signal, the signal COS $\omega_{LO}t$ easily leaks to combine with the input signal S1 if the conductive line is not completely isolated from the conductive line for transmitting the input signal S1, thus, the next one radio frequency signal carries the unwanted leakage signal, and the converted baseband signal carries a DC offset value. FIG. 2 shows another DC offset generation event. Since the Zero IF receiver converts a radio frequency signal to a baseband signal dircectly, the input signal S1 easily leaks to combine with the signal COS $\omega_{LO}t$ if the conductive line to the mixer is not completely isolated from the conductive line for transmitting the input signal S1.

Figure 3:
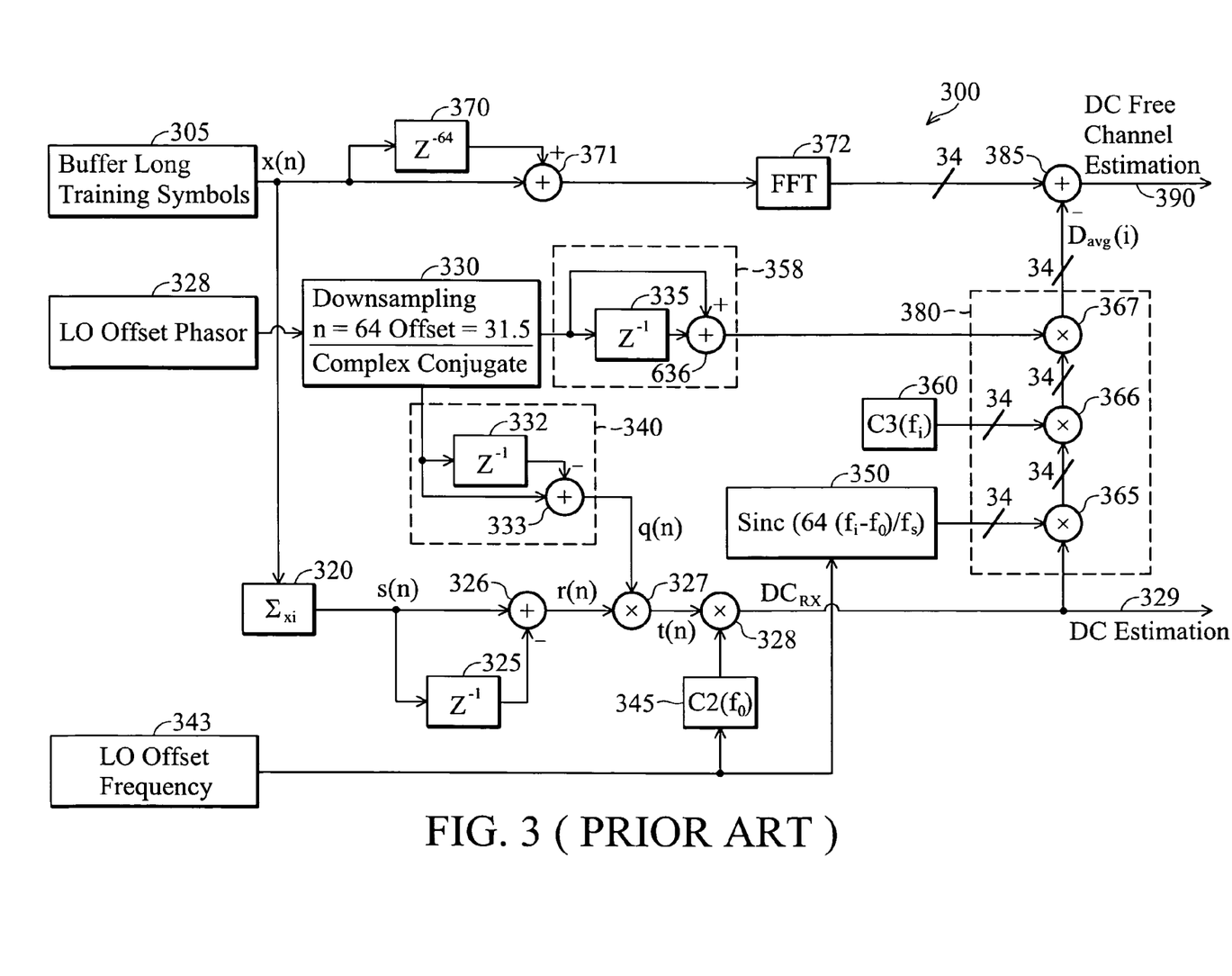
FIG. 3 is a schematic block diagram of a conventional OFDM receiver 300 for performing DC estimation and compensation for the long training symbols.

FIG. 3 is a schematic block diagram of a conventional OFDM receiver 300 for performing DC estimation and compensation for long training symbols. This implementation attempts to determine the estimated value of the signal, s(n), in order to estimate the DC offset. The signal s(n) shown in FIG. 3 may be referred to as DC offset distortion at subcarrier 0. The DC offset is estimated based on the two local oscillator (LO) offset-corrected long training symbols that are components of an OFDM preamble. Since the OFDM spectrum may contain severe carrier leakage, the DC estimation based on subcarrier 0 of one OFDM symbol may be distorted and not useful. Thus, the difference of two successive DC estimations is used, canceling out the constant carrier leakage value at subcarrier 0, but retaining some value representing the receiver DC offset (signal r(n) in FIG. 3).

As shown in FIG. 3, the sum of all 34 input time domain samples is computed for the long training symbols x(n) (from the long training symbol buffer 305) by the summation unit 320 to generate a signal, s(n). The signal s(n) is fed through a delay unit 325 and subtracted (block 326) from the current value of s(n) to generate signal r(n).

To calculate the true DC level at the input (i.e., the output of the analog-to-digital converters), the output r(n) is processed to compensate for the Local Oscillator offset compensation (the difference between the transmitter and receiver local oscillators). To accomplish this, the LO offset phasor 328 is down sampled by a factor of 64 (block 330) and complex conjugated, the difference of two consecutive phasor values is calculated (block 340), and the result q(n) is multiplied (block 327) with r(n) to produce t(n). The LO offset frequency 343 is then processed with a compensation factor 345 and multiplied (block 328) with t(n). The result is the receiver DC offset estimate $DC_{RX}$ 329. It should be noted that block 340 comprises a delay unit 332 and subtraction unit 333 that operate in a manner similar to that of delay unit 325 and subtraction unit 326.

The remainder of the circuitry in FIG. 3 is designed to compensate for the DC offset $DC_{RX}$ 329, local oscillator offset (LOO), and the effects of subcarrier rotation. The computed receiver DC offset estimate $DC_{RX}$ 329 is passed through the compensation processing block 380 to calculate the DC contribution in the frequency domain (Davg(i)). Block 350 determines the DC power contribution to each subcarrier (sinc shape) as a function of the LO offset frequency 343. Block 360 is a compensation factor to compensate for the effect of the sub carrier rotation. The down sampled local oscillator offset phasor is averaged over two samples (block 358) to produce the local oscillator offset used by block 380 (block 380 comprises multiplier units 365-367).

The buffer long training symbols 305 are also delayed (block 370) and summed (block 371) to derive the required 64 time samples for input to the FFT block 372. The DC contribution in the frequency domain (Davg(i)) is then added (block 385) to the output of the fast fourier transform (performed by FFT 372) to generate the DC free channel estimation 390. It is noted that the DC free channel estimation 390 is obtained after removing the training data symbols per subcarrier. The removal of the DC offset from each subcarrier should take into account the fact that the Long Training Symbols are averaged over two DC estimations (done by means of block 358).

In FIG. 3, the DC offset estimation method is based on the carrier frequency offset, and at least two repeated training symbols or OFDM symbols are required for DC offset estimation. However, the preambles and the OFDM symbols in 802.16e standard, for example, do not have the ideal repetition feature, thus, the conventional DC offset estimation method based on the carrier frequency offset cannot be applied in 802.16e standard.

BRIEF SUMMARY OF THE INVENTION

The invention of a DC offset estimation system comprises a carrier frequency offset estimator, a symbol timing recovery unit and a DC offset estimator. The carrier frequency offset estimator receives an input signal and estimates a carrier frequency offset value. The symbol timing recovery unit provides a symbol boundary on the input signal. The DC offset estimator estimates a DC offset value to compensate the input signal based on the input signal, the carrier frequency offset value, and the timing information.

The invention of a DC offset estimation method comprises estimating a fractional carrier frequency offset value of a input signal; determining a DC offset value by averaging plural OFDM symbols in response to the fractional carrier frequency offset value does not exceed a predetermined value; determining the DC offset value by a CP-based DC offset estimation method based on the fractional carrier frequency offset value in response to the fractional carrier frequency offset value exceeds a predetermined value.

The invention of a DC offset estimation system comprises a correction term generator, a first mixer, a difference value generator, and a second mixer. The correction term generator receives a carrier frequency offset data to generate a correction term. The first mixer receives and mixes an input signal with the carrier frequency offset data to compensate carrier frequency offset. The difference value generator generates a difference value based on a pair of compensated input samples. The second mixer receives the correction term and the difference value to generate a DC offset value.

The invention of a DC offset estimation method, comprises estimating a carrier frequency offset value; compensating an input signal with the carrier frequency offset value; calculating a cosecant value based on the carrier frequency offset value; estimating a difference value based on a pair of compensated input samples; calculating a correction term based on the carrier frequency offset value; determining a DC offset value based on the correction term and the difference value.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 4:
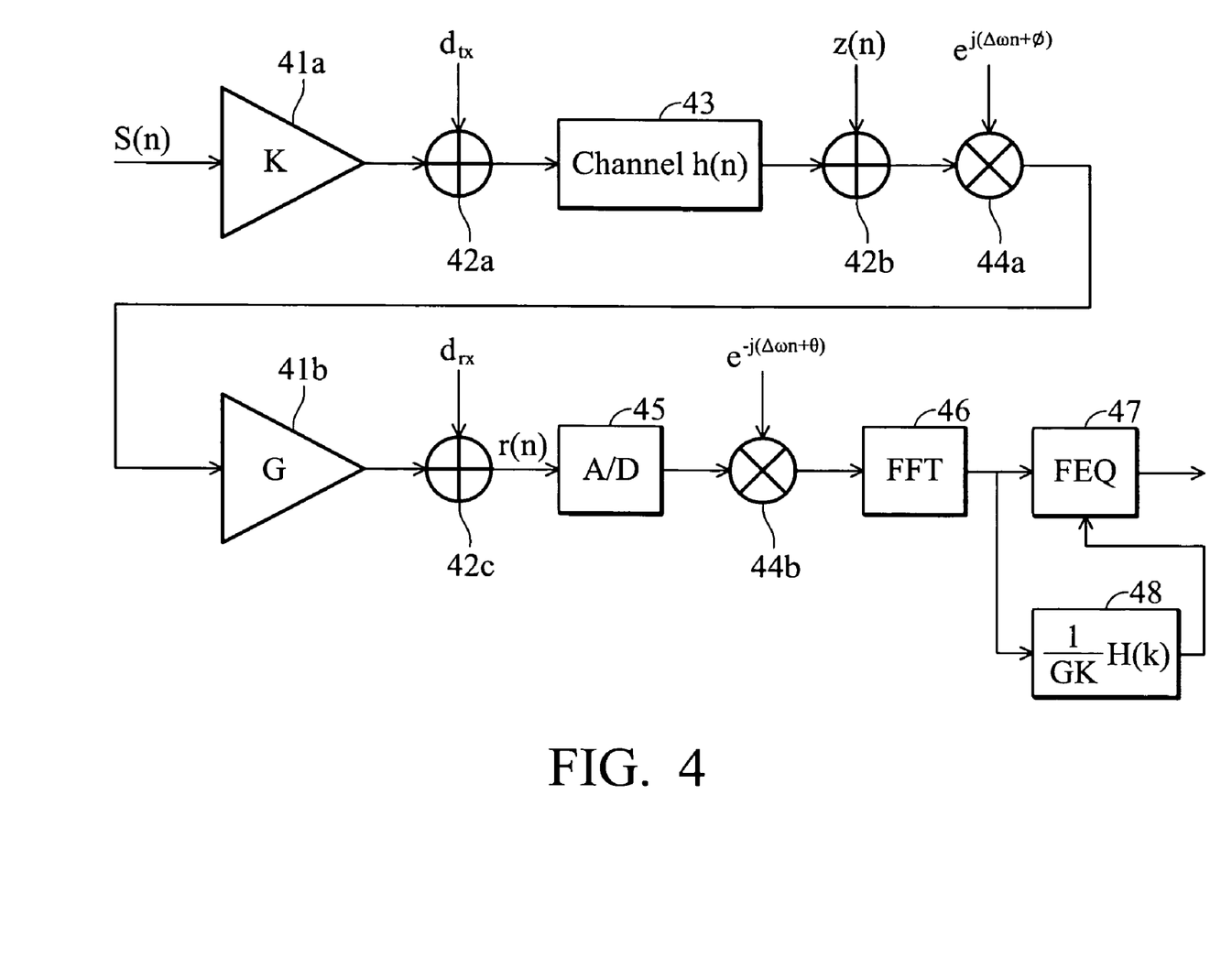
FIG. 4 is a block diagram of the DC offset signal model in the OFDM system.

FIG. 4 is a block diagram of the DC offset signal model in the OFDM system. As shown in FIG. 4, both in the transmitter end and receiver end, the DC offsets $d_{tx}$ and $d_{rx}$ are generated and are respectively added by adders 42a and 42c. When the signal is transmitted in channel 43, noise z(n) and carrier frequency offset $\exp(j(\Delta\omega n+\phi))$ are also generated. Amplifiers 41a and 41b respectively provide gain factors K and G to adjust the signal amplitude in a predetermined range for better A/D conversion performance in A/D converter 45. Supposing the parameter K and G are 1, the received signal r(n) can be expressed by the following expression:

$$r(n) = [(s(n) + d_{tx}) * h(n) + z(n)]e^{j(\Delta\omega n+\phi)} + d_{rx} \quad (1)$$

$$= s(n) * h(n)e^{j(\Delta\omega n+\phi)} + d_{tx} * h(n)e^{j(\Delta\omega n+\phi)} +$$

$$z(n)e^{j(\Delta\omega n+\phi)} + d_{rx}$$

$$= y(n)e^{j(\Delta\omega n+\phi)} + d'_{tx}e^{j(\Delta\omega n+\phi)} + z'(n) + d_{rx}$$

The function h(n) represents an equivalent transmission function when the signal is transmitted in channel 43. The signal z(n) representing the AWGN noise is added to the received signal r(n) by adder 42b. The term $\exp(j(\Delta\omega n+\phi))$ represents the carrier frequency offset between the transmitter and the receiver and is imposed on the signal s(n) by the multiplier 44a. The carrier frequency offset (CFO) comprises both integer carrier frequency offset and fractional carrier frequency offset, and expressed by the following expression:

$$\Delta\omega = k\frac{2\pi}{N_{FFT}} + \delta\omega, \quad (2)$$

where $$-\pi/N_{FFT} \le \delta\omega < \pi/N_{FFT}, \text{ and } k = 0, \pm 1, \ldots$$

In expression (2), k is the number of integer frequency offset. Substituting (2) into (1), the received signal r(n) is expressed by the following expression:

$$r(n)=y(n)e^{j((2\pi k/N_{FFT}+\delta\omega)n+\phi)}+d'_{tx}e^{j((2\pi k/N_{FFT}+\delta\omega)n+\phi)}+z'(n)+d_{rx}$$

After the received signal r(n) is compensated by a the carrier frequency offset value $e^{-j(\Delta\omega n+\theta)}$ in the mixer 44b, the received signal r(n) is expressed by the following expression:

$$r'(n)=r(n)e^{-j(\Delta\omega n+\theta)}=y(n)e^{j(\phi-\theta)}+d'_{tx}e^{j(\phi-\theta)}+z''(n)+ \\ d_{rx}e^{-j(\Delta\omega n+\theta)} \quad (3)$$

Since the OFDM symbol comprises the cylix prefix (CP) and signals transmitted in CP has the feature shown as the following:

$$s(n+N_{FFT})=s(n)$$

Thus, signal $s(n+N_{FFT})$ can be expressed by the following expression:

$$r'(n + N_{FFT}) = r(n + N_{FFT})e^{-j(\Delta\omega(n+N_{FFT})+\theta)} \quad (4)$$

$$= y(n + N_{FFT})e^{j(\phi-\theta)} + d'_{tx}e^{j(\phi-\theta)} +$$

$$z''(n + N_{FFT}) + d_{rx}e^{-j(\Delta\omega(n+N_{FFT})+\theta)}$$

$$= y(n)e^{j(\phi-\theta)} + d'_{tx}e^{j(\phi-\theta)} + z''(n + N_{FFT}) +$$

$$d_{rx}e^{-j(\Delta\omega(n+N_{FFT})+\theta)}$$

Subtract (3) from (4), to obtain expression (5) as shown in the following:

$$\tilde{d}_{rx}(n) = r'(n + N_{FFT}) - r'(n) \quad (5)$$

$$= d_{rx}e^{-j(\Delta\omega n+\theta)}(e^{-j(\Delta\omega N_{FFT})} - 1) +$$

$$(z''(n + NFFT) - z''(n))$$

$$= -2j(d_{rx}e^{-j(\Delta\omega n+\theta)})\sin\left(\frac{N_{FFT}}{2}\Delta\omega\right)e^{-j\Delta\omega N_{FFT}/2} + z'''(n)$$

The DC offset estimation value in receiver can be expressed by the following expression (6):

$$\hat{d}_{rx}(n) = \frac{j\tilde{d}_{rx}(n)}{2}e^{j(\Delta\omega n+\theta)}\csc\left(\frac{N_{FFT}}{2}\Delta\omega\right)e^{j\Delta\omega N_{FFT}/2} \quad (6)$$

$$= d_{rx} + \frac{jz'''(n)}{2}\csc\left(\frac{N_{FFT}}{2}\Delta\omega\right)e^{j(\Delta\omega(n+N_{FFT}/2)+\theta)}$$

$$= d_{rx} + \zeta(n)$$

In expression (6), we can find that the DC offset estimation value is a product of a correction term of carrier frequency offset and a difference value between one point data in CP period and its corresponding point data in the compensated signal.

Figure 5:
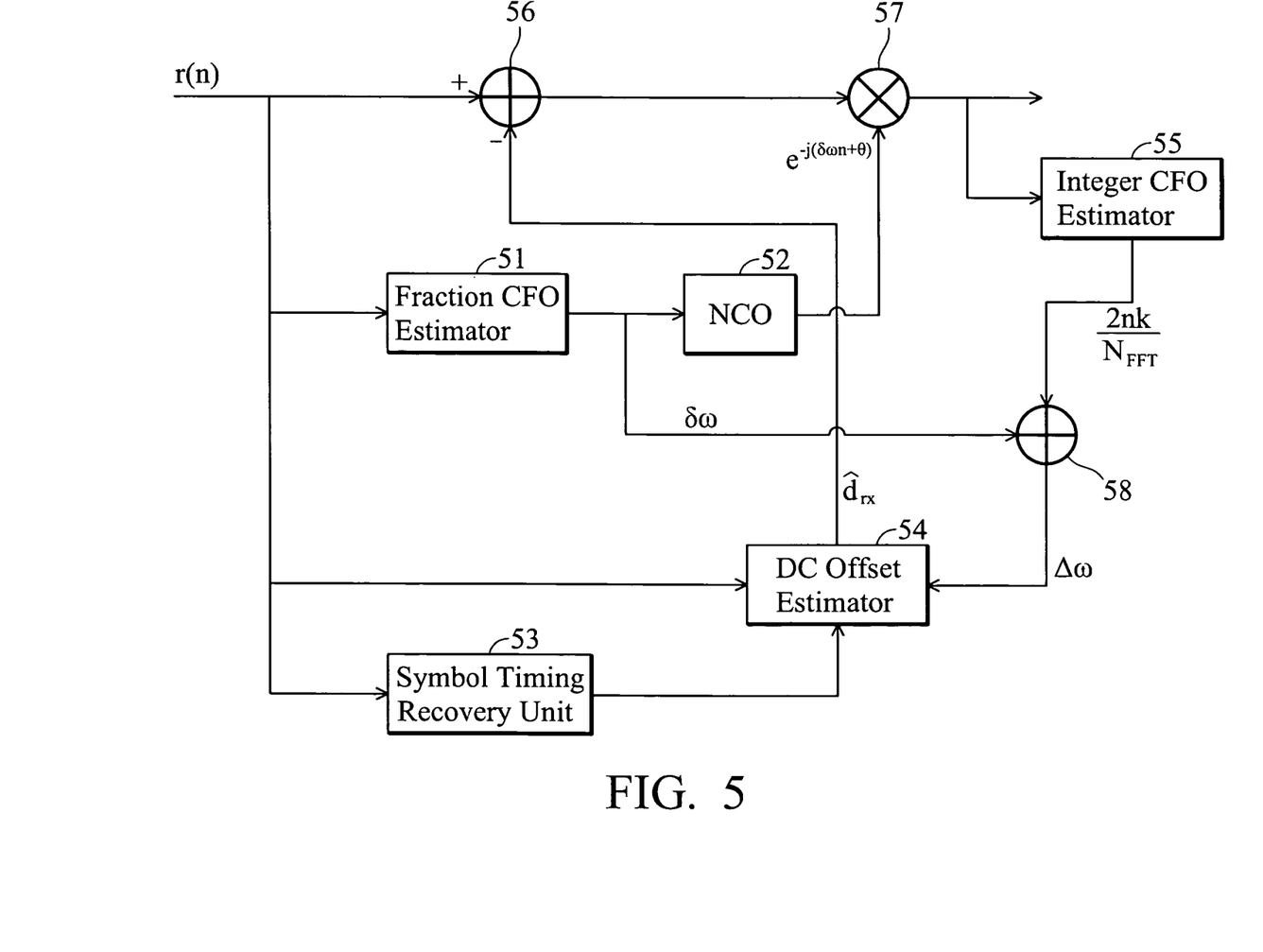
FIG. 5 is a block diagram of a DC offset estimation system of one embodiment of the invention based on the expressions (1)~(6).

According the described derivation, a block diagram of a DC offset estimation system of one embodiment of the invention based on the expressions (1)~(6) is shown in FIG. 5. Symbol timing recovery unit 53 provides the symbol boundary for the DC offset estimation method and provides plural sampled data to a DC offset estimator 54 based on the input signal r(n) and the timing. Numerically controlled oscillator (NCO) 52 generates a correction term, $e^{-j(\delta\omega n+\theta)}$, composed of sine and cosine waves mixed with the incoming signal r(n) to correct the frequency error by mixer 57. The fractional CFO estimator 51 receives the incoming signal r(n) to estimate the value of fractional carrier frequency offset $\delta\omega$. The integer CFO estimator 55 generates the integer carrier frequency offset $$\frac{2\pi k}{N_{FFT}}$$

based on the output signal of mixer 57. The adder 58 adds the integer carrier frequency offset $$\frac{2\pi k}{N_{FFT}}$$

and the fractional carrier frequency offset $\delta\omega$ to generate the carrier frequency offset $\Delta\omega$. The DC offset estimator 54 receives the input signal r(n), sampled data from the symbol timing recovery 53, and the carrier frequency offset $\Delta\omega$ to estimate a DC offset value, $\hat{d}_{rx}$. The adder 56 subtracts the DC offset value $\hat{d}_{rx}$ from the input signal r(n).

In the system shown in FIG. 5, note that the DC offset value is estimated after the integer carrier frequency offset and the fractional carrier frequency offset had been estimated. This defers the time of obtaining DC offset estimates. Thus, in another aspect of the invention the DC offset compensation method only requires the fractional carrier frequency offset value. The signal after compensating the fractional carrier frequency offset is expressed as shown in the following:

$$\tilde{r}'(n) = r(n)e^{-j(\delta\omega n+\theta)} \quad (7)$$

$$= y(n)e^{j((2\pi k/N_{FFT}+\delta\omega)n+\phi)}e^{-j(\delta\omega n+\theta)} +$$

$$d'_{tx}e^{j((2\pi k/N_{FFT}+\delta\omega)n+\phi)}e^{-j(\delta\omega n+\theta)} +$$

$$z'(n)e^{-j(\delta\omega n+\theta)} + d_{rx}e^{-j(\delta\omega n+\theta)}$$

$$= y(n)e^{j(2\pi kn/N_{FFT})}e^{j(\phi-\theta)} + d'_{tx}e^{j(2\pi kn/N_{FFT})}e^{j(\phi-\theta)} +$$

$$\tilde{z}''(n) + d_{rx}e^{-j(\delta\omega n+\theta)}$$

Replacing $\tilde{r}'(n)$ by $\tilde{r}'(n+N_{FFT})$ $$\tilde{r}'(n+N_{FFT}) = y(n)e^{j(2\pi k(n+N_{FFT})/N_{FFT})}e^{j(\phi-\theta)} + \quad (8)$$

$$d'_{tx}e^{j(2\pi k(n+N_{FFT})/N_{FFT})}e^{j(\phi-\theta)} +$$

$$\tilde{z}''(n+N_{FFT}) + d_{rx}e^{-j(\delta\omega(n+N_{FFT})+\theta)}$$

$$= y(n)e^{j(2\pi kn/N_{FFT})}e^{j(\phi-\theta)} +$$

$$d'_{tx}e^{j(2\pi kn/N_{FFT})}e^{j(\phi-\theta)} + \tilde{z}''(n+N_{FFT}) +$$

$$d_{rx}e^{-j(\delta\omega(n+N_{FFT})+\theta)}$$

According to expression (7) and (8), the DC offset estimation value in receiver can be expressed by the following expression:

$$\hat{d}_{rx}(n) = \frac{j(\tilde{r}'(n+N_{FFT}) - \tilde{r}'(n))}{2} e^{j(\delta\omega n+\theta)}\csc\left(\frac{N_{FFT}}{2}\delta\omega\right)e^{j\delta\omega N_{FFT}/2}$$

$$= d_{rx} + \frac{j\tilde{z}'''(n)}{2}\csc\left(\frac{N_{FFT}}{2}\delta\omega\right)e^{j(\delta\omega(n+N_{FFT}/2)+\theta)}$$

$$= d_{rx} + \tilde{\zeta}(n)$$

Figure 6:
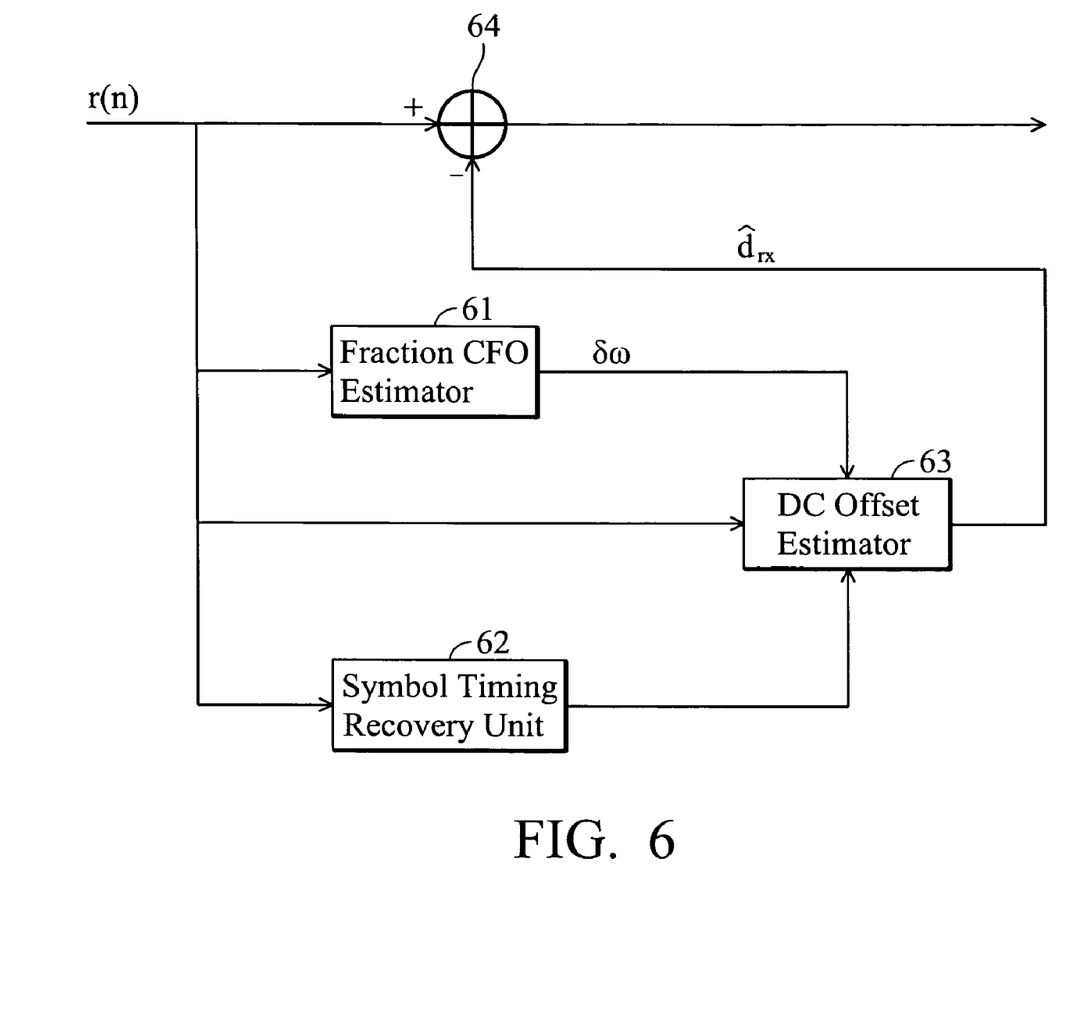
FIG. 6 is a block diagram of a DC offset estimation system of one embodiment of the invention based on the expressions (7) and (8).

FIG. 6 is a block diagram of a DC offset estimation system of one embodiment of the invention based on the expressions (7) and (8). Symbol timing recovery unit 62 provides a symbol boundary for the DC offset estimation method and provides a plurality of sampled data to a DC offset estimator 63 based on the input signal r(n) and the timing. The fractional CFO estimator 61 receives the incoming signal r(n) to estimate the value of fractional carrier frequency offset $\delta\omega$. The DC offset estimator 63 receives the input signal r(n), and the fractional carrier frequency offset $\delta\omega$ to estimate a DC offset value, $\hat{d}_{rx}$. The adder 64 subtracts the DC offset value $\hat{d}_{rx}$ from the input signal r(n).

Figure 7:
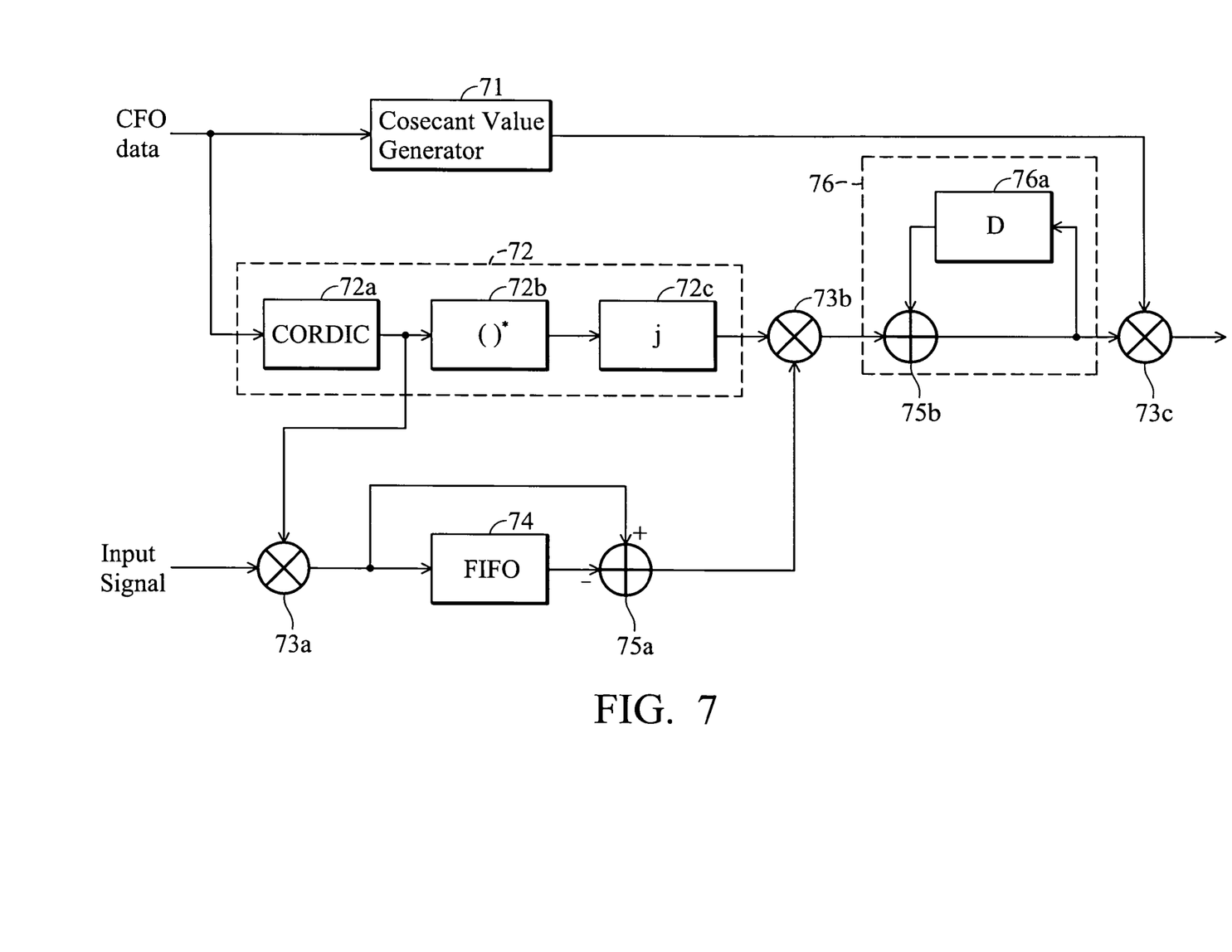
FIG. 7 is another embodiment of a DC offset estimation system based on another aspect of invention.

FIG. 7 is another embodiment of a DC offset estimation system. According to the DC offset estimation system shown in FIG. 4 to 6, it is revealed that the DC value is estimated based on a correction term of carrier frequency offset and a difference value between one point data in CP period and its corresponding point data in the compensated signal. The correction term generator 72 receives a carrier frequency offset data (CFO data) to generate a correction term. The first mixer 73a receives and mixes an input signal with the carrier frequency offset data to compensate carrier frequency offset. The difference value generator, including the FIFO register 74 and adder 75a, computes the difference between the data sample in CP period and its corresponding sample in the compensated signal. The second mixer 73b receives the correction term and the difference value to generate a distorted DC offset estimate. The accumulator 76, including a delay unit 76a and adder 75b, receives a plurality of distorted DC offset estimates to output an estimation error suppressed DC offset signal. The cosecant value generator 71 receives the carrier frequency offset data to generate a cosecant value based on the carrier frequency offset value. The correction term generator 72 comprises a coordinate rotation digital calculation (CORDIC) unit 72a, a computing unit 72b and an IQ swap unit 72c. The coordinate rotation digital calculation unit 72a receives the carrier frequency offset data and generates the sine and cosine sequences with the frequency equal to the carrier frequency offset. The computing unit 72b coupled to the coordinate rotation digital calculation unit 72a receives and calculates a complex conjugate of the coordinate rotation digital calculation unit output data. The IQ swap mapping unit 72c receives and multiplies a j to the output signal of the computing unit 72b. In this embodiment, the mixer 73a receives and mixes an input signal with the rotated carrier frequency offset data from the correction term generator 72 to compensate carrier frequency offset.

Figure 8:
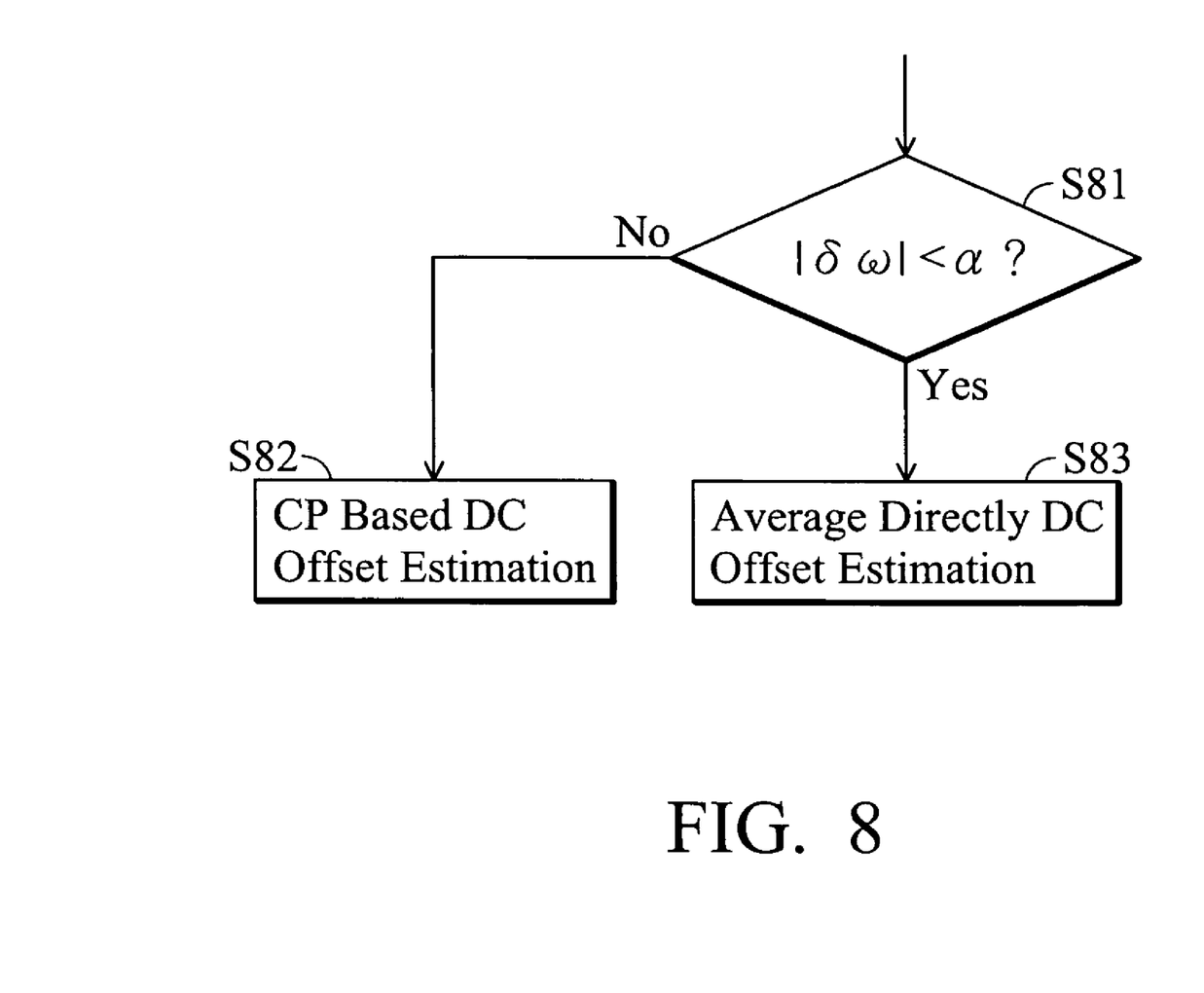
FIG. 8 shows a determination mechanism for DC offset estimation.

FIG. 8 shows a determination mechanism for DC offset estimation. Please refer to the expression (2). In step S81, the value of the term $|\delta\omega|$ is determined whether the term is smaller than a predetermined value $\alpha$. If $|\delta\omega|<\alpha$, the determination mechanism jumps to the step S83, and the DC offset value is determined by averaging over a plurality of OFDM symbols comprising preamble, data or frame control head (FCH). If |δω|>α, the determination mechanism jumps to the step S82, and the method of DC offset estimation considers both integer carrier frequency offset and fraction carrier frequency offset, a CP based DC offset estimation method is applied to calculate the DC offset value.

Figure 9:
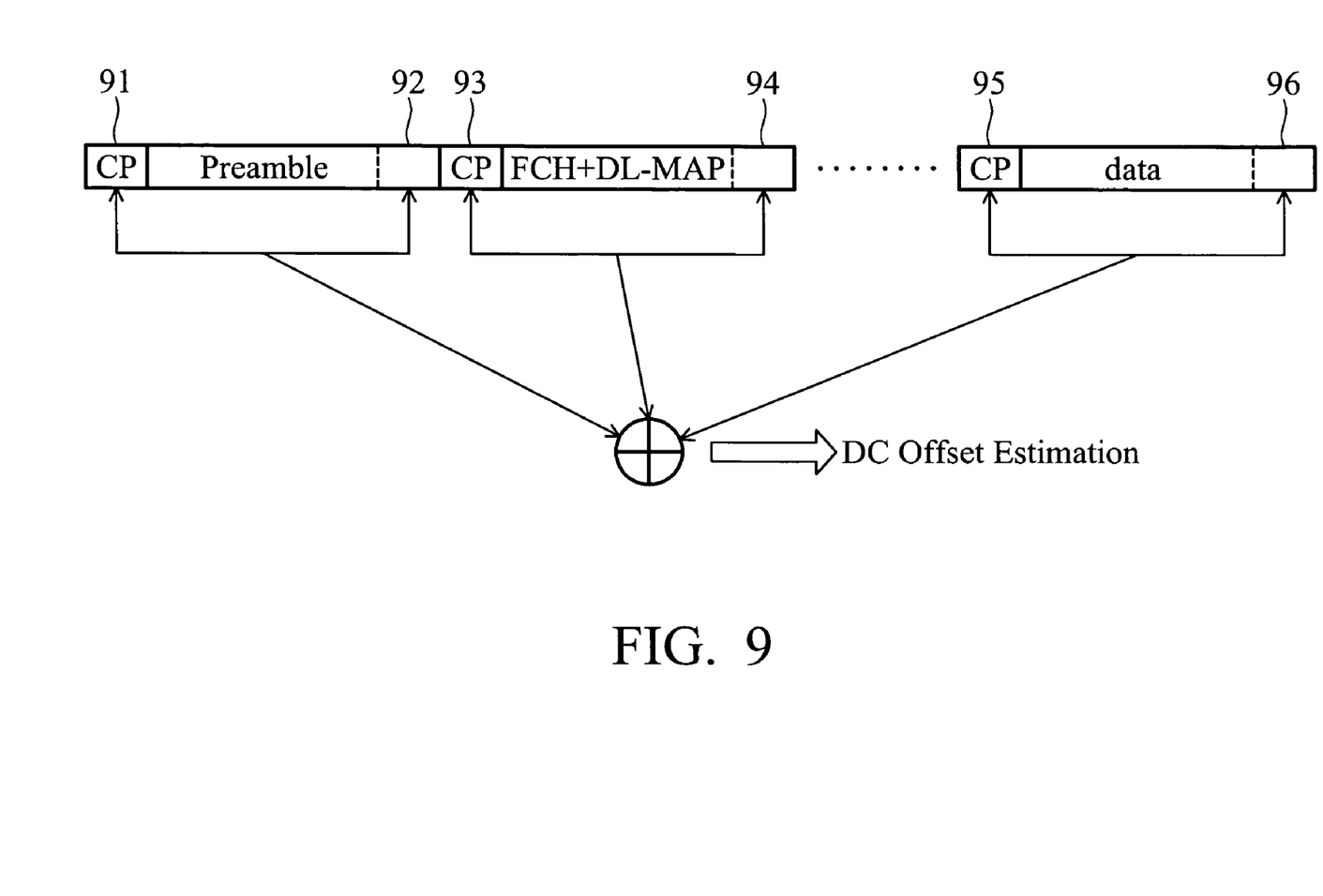
FIG. 9 shows a DC offset estimation method based on an averaged signal calculated by averaging a plurality of OFDM symbols.

FIG. 9 shows a DC offset estimation method based on an averaged signal calculated by averaging a plurality of OFDM symbols. A first signal value is calculated by averaging over $N_{FFT}$ samples of the first OFDM symbol starting from the middle of the first cyclic prefix (CP) 91. A second signal value is calculated by averaging over $N_{FFT}$ samples of the second OFDM symbol starting from the middle of the second CP 93. A third signal value is calculated by averaging over $N_{FFT}$ samples of the third OFDM symbol starting from the middle of the third CP 95. An adder is applied to sum and average the first signal value, the second signal value, and the third signal value. Then, the DC offset estimation method estimates the DC offset value based on the averaged signal value. In one embodiment, at least four OFDM symbols are required to estimate the DC offset value based on the averaged signal value of the OFDM symbols.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC offset estimation system, comprising:
   a carrier frequency offset estimator receiving an input signal and estimating a carrier frequency offset value, wherein the carrier frequency offset estimator comprises both a fractional carrier frequency offset estimator and an integer carrier frequency offset estimator to generate both the fractional carrier frequency offset value and the integer carrier frequency offset value;
   a symbol timing recovery unit providing a symbol boundary of the input signal;
   a DC offset estimator estimating a DC offset value to compensate the input signal based on the input signal, the carrier frequency offset value, and the symbol boundary.

2. The system as claimed in claim 1, wherein the carrier frequency offset estimator comprises a fractional carrier frequency offset estimator to generate a fractional carrier frequency offset value.

3. The system as claimed in claim 1, further comprising a numerically controlled oscillator generating sine and cosine waves that are mixed with the input signal to correct the frequency error of the input signal.

4. The system as claimed in claim 2, wherein the DC offset estimator estimates the DC offset value by averaging plural OFDM symbols in response to the fractional carrier frequency offset value does not exceed a predetermined value.

5. The system as claimed in claim 1, wherein the DC offset estimator includes a delay-locked loop configuration to estimate the DC offset value based on a pair of sample points within an OFDM symbol.

6. A DC offset estimation and compensation method executed by a DC offset estimation system in an OFDM system, comprising:
   estimating a fractional carrier frequency offset value of an input signal;
   determining a DC offset value by averaging plural OFDM symbols in response to the fractional carrier frequency offset value does not exceed a predetermined value;
   determining the DC offset value by a CP-based DC offset estimation method based on the fractional carrier frequency offset value in response to the fractional carrier frequency offset value exceeds a predetermined value; and
   compensating the input signal according to the DC offset value.

7. The method as claimed in claim 6, wherein the CP-based DC offset estimation method is based on a correction term of the fractional carrier frequency offset and a difference between a pair of sample points in the compensated signal.

8. The method as claimed in claim 6, wherein the fractional carrier frequency offset value is further processed by a numerically controlled oscillator generating sine and cosine waves that are mixed with the signal to correct the frequency error of the input signal.

9. The method as claimed in claim 6, wherein the CP-based DC offset estimation method comprises:
   estimating a carrier frequency offset value including the fractional carrier frequency offset value and a integer carrier frequency offset value;
   compensating the signal with the carrier frequency offset value for correcting the frequency error of the input signal;
   calculating a cosecant value based on the carrier frequency offset value;
   estimating a difference value based on a pair of compensated input data samples;
   calculating a correction term based on the carrier frequency offset value; and
   determining a DC offset value based on the correction term and the difference value.

10. The method as claimed in claim 6, wherein the CP-based DC offset estimation method comprises:
    compensating the signal with the fractional carrier frequency offset value for correcting the frequency error of the input signal;
    calculating a cosecant value based on the fractional carrier frequency offset value;
    estimating a difference value based on a pair of compensated input data samples;
    calculating a correction term based on the fractional carrier frequency offset value; and
    determining a DC offset value based on the correction term and the difference value.

11. The method as claimed in claim 9, wherein the DC offset value is further based on the cosecant value.

12. The method as claimed in claim 10, wherein the DC offset value is further based on the cosecant value.

13. A DC offset estimation system, comprises:
    a correction term generator receiving a carrier frequency offset data to generate a correction term;
    a first mixer receiving and mixing an input signal with the carrier frequency offset data to compensate carrier frequency offset;
    a difference value generator to generate a difference value based on a pair of compensated input samples;
    a second mixer receiving the correction term and the difference value to generate a DC offset value; and an accumulator receiving a plurality of DC offset estimates to output an accurate DC offset estimate.

14. The system as claimed in claim 13, further comprising a cosecant value generator receiving the carrier frequency offset data to generate a cosecant value based on the carrier frequency offset value.

15. The system as claimed in claim 14, further comprising a third mixer to output an adaptive DC offset signal based on the DC offset value and the cosecant value.

16. The system as claimed in claim 13, wherein the correction term generator comprises a coordinate rotation digital calculation unit to rotate the carrier frequency offset data with an angle.

17. The system as claimed in claim 13, wherein the correction term generator comprises a computing unit to calculate a complex conjugate of the carrier frequency offset data.

18. The system as claimed in claim 13, wherein the correction term generator comprises a mapping unit to map the carrier frequency offset data.

19. The system as claimed in claim 13, wherein the difference value generator comprises a FIFO register.

20. The system as claimed in claim 13, wherein the difference value generator comprises:

a FIFO register storing the compensated input signal; and
an adder to subtract the output signal from the FIFO register from the compensated input signal from the first mixer to calculate the difference value.

21. A DC offset estimation and compensation method executed by a DC offset estimation system in an OFDM system, comprising:

estimating a carrier frequency offset value of an input signal;
compensating the input signal with the carrier frequency offset value;
calculating a cosecant value based on the carrier frequency offset value;
estimating a difference value based on a pair of compensated input signal;
calculating a correction term based on the carrier frequency offset value; and
determining a DC offset value based on the correction term and the difference value.

22. The method as claimed in claim 21, wherein the DC offset value is further based on the cosecant value.

* * * * *

UNITED STATES PATENT AND TRADEMARK OFFICE
CERTIFICATE OF CORRECTION

| | | |
|---|---|---|
| PATENT NO. | : 7,933,348 B2 | |
| APPLICATION NO. | : 11/882918 | |
| DATED | : April 26, 2011 | |
| INVENTOR(S) | : Yung-Yih Jian et al. | |

It is certified that error appears in the above-identified patent and that said Letters Patent is hereby corrected as shown below:

ON THE TITLE PAGE:

Please insert the following:

-- Related U.S. Application Data

(60) Provisional application No. 60/845,519, filed on Sep. 19, 2006. --

Signed and Sealed this
Thirty-first Day of July, 2012

David J. Kappos
*Director of the United States Patent and Trademark Office*